United States Patent [19]

Scherm

[11] Patent Number: 4,878,693

[45] Date of Patent: Nov. 7, 1989

[54] SHEET MATERIAL CARRIER

[76] Inventor: Peter Scherm, 1508 Glenleaf Dr., Norcross, Ga. 30092

[21] Appl. No.: 271,927

[22] Filed: Nov. 16, 1988

[51] Int. Cl.[4] ........................ B42D 17/00; B42F 13/00; F16B 2/20; F16B 21/00

[52] U.S. Cl. ........................................ 281/45; 402/17; 160/380; 411/346

[58] Field of Search ............... 281/29, 43, 45; 402/17, 402/64, 73, 76; 411/340, 341, 342, 343, 344, 345, 346, 554; 211/49.1, 54.1, 50.51; 225/27; 160/380

[56] References Cited

U.S. PATENT DOCUMENTS

| | | | |
|---|---|---|---|
| 2,635,608 | 4/1953 | Shepherd | 402/44 |
| 3,217,372 | 11/1965 | Fellowes | 402/17 |
| 4,043,245 | 8/1977 | Icaplan | 411/346 |
| 4,677,775 | 7/1987 | Riley | 160/380 |
| 4,687,229 | 8/1987 | Penniman | 281/45 |
| 4,807,906 | 2/1989 | Seaver | 281/45 |

*Primary Examiner*—Frank T. Yost
*Assistant Examiner*—Paul M. Heyrana, Sr.
*Attorney, Agent, or Firm*—Thomas & Kennedy

[57] ABSTRACT

An apparatus for transporting sheet material of the type having perforated marginal edge portions comprises a base adapted to receive and support the sheet material with the base having upstanding ratchet toothed stanchions positioned about its periphery. A cover bearing a handle has latch means adapted to receive and operatively couple with the upstanding stanchions to allow the base, cover and sheet material contained therebetween to be easily hand carried. The base is provided with upstanding pins positioned to register with the marginal edge perforations of the sheet material and guide flanges mounted to the base guide the sheet material into proper position atop the base.

12 Claims, 3 Drawing Sheets

SHEET MATERIAL CARRIER

TECHNICAL FIELD

The present invention relates to sheet material such as fan fold computer paper and particularly to a method and apparatus for containing and transporting such sheet material.

BACKGROUND OF THE INVENTION

In modern business and industry, records and documents are often produced with the aid of computers and printed on high-speed computer printers. It is common for such records and documents to be printed on sheet material such as computer paper of the type commonly known as EDP paper. EDP paper typically consists of a large number of sheets connected together along tearable perforations and folded one upon the other in fanfold fashion. Each sheet is provided along opposed marginal edge portions with perforations adapted to register with pins within a printer to maintain the paper in proper alignment. Computer paper is usually shipped to users in cardboard boxes that can contain several thousand sheets.

Handling and transporting computer paper can be difficult and frustrating. The paper usually fits tightly into its shipping container so that the paper is virtually impossible to lift from the container. As a consequence, in order to remove paper from its container, it is often necessary to cut or otherwise destroy the container or simply remove the top of the container, upend it and dump the paper onto the floor or table. Once removed, the paper can be heavy and ungainly such that attempts to carry it often cause the paper to topple to the floor creating a frustrating mess.

Heretofore, efforts have been directed toward organizing and storing business records printed on computer paper. Such efforts have resulted in binders and other storage devices such as those exemplified by U.S. Pat. Nos. 3,217,372 of Fellowes, 3,706,502 of LaFleur and 4,288,170 of Barber. While these devices greatly simplify storage of computer records, they are of little use when unpacking and handling stacks of paper prior to its being printed, bound and stored. There is a perceived and unaddressed need for an apparatus and method for collecting, containing and facilitating convenient hand carrying of stacks of sheet material such as computer paper. It is to the provision of such a method and apparatus that the present invention is primarily directed.

SUMMARY OF THE INVENTION

Briefly described, the present invention is a sheet material carrier that comprises a generally rectangular base adapted to support a stack of computer paper. Two rows of pins extend upwardly from the base and are positioned to register with and extend into the perforated marginal edge portions of the paper to maintain the paper in place upon the base.

A guide flange is mounted to each leg of the base and extends upwardly and outwardly therefrom at an angle relative to the plane of the base. The guide flanges serve to guide the paper laterally into position on the base with the upstanding pins registered with the paper's perforated marginal edge portions as the paper is received by the base. An elongated stanchion extends upwardly from each corner of the base with each stanchion having a row of ratchet teeth formed along its length. A cover bearing a handle has a size corresponding to that of the base and is adapted to rest atop a stack of paper of any conventional height supported on the base.

The cover includes at each of its corners a latch that has a spring biased pawl. Each latch is adapted to receive a corresponding stanchion of the base with the pawl biased into engagement with the ratchet teeth formed along the stanchion. The ratchet teeth and pawls are configured to permit movement of the cover downwardly into engagement with paper supported on the base while coupling together to prevent subsequent upward movement of the cover. In this way, the cover can be moved downwardly atop a stack of paper supported on the base with the stanchions extending through the latches and, when in place, the cover, base and paper can be conveniently lifted and carried by the handle mounted to the cover.

A lever extends upwardly from each pawl so that depression of the levers disengages the pawls from the ratchet teeth allowing the cover to be removed from atop the paper. In this way, the cover is easily removed when desired so that paper can be drawn from the stack for use in the conventional way.

A base of the type described can be positioned to receive paper as it issues from the printer if desired and when the base is filled, a cover can simply be placed atop the stack and the cover, base and paper carried as described or, alternatively, the paper can be carried on the base alone with the base supporting the paper as it is carried. In addition, paper can be packaged for shipment in boxes with the paper resting upon a base and, upon receipt of the box and removal of the box top, the paper can be removed from the box by simply positioning a cover atop the paper and lifting the paper from the box. A base for use in this way might not include the previously described flanges so that the paper would fit tightly in the box to restrict shifting.

Thus, it is seen that a unique paper container and carrier is provided that accepts and securely contains a stack of paper and simultaneously facilitates convenient hand carrying of the paper. Traditional problems associated with removal of the paper from its shipping container are greatly reduced, and the chance that the paper will topple to the floor while being carried is virtually eliminated. Other objects, advantages and features of the invention will become more apparent upon reading the following detailed description in conjunction with the attached drawings.

DETAILED DESCRIPTION OF THE PREFERRED EMBODIMENT

Figure 1:
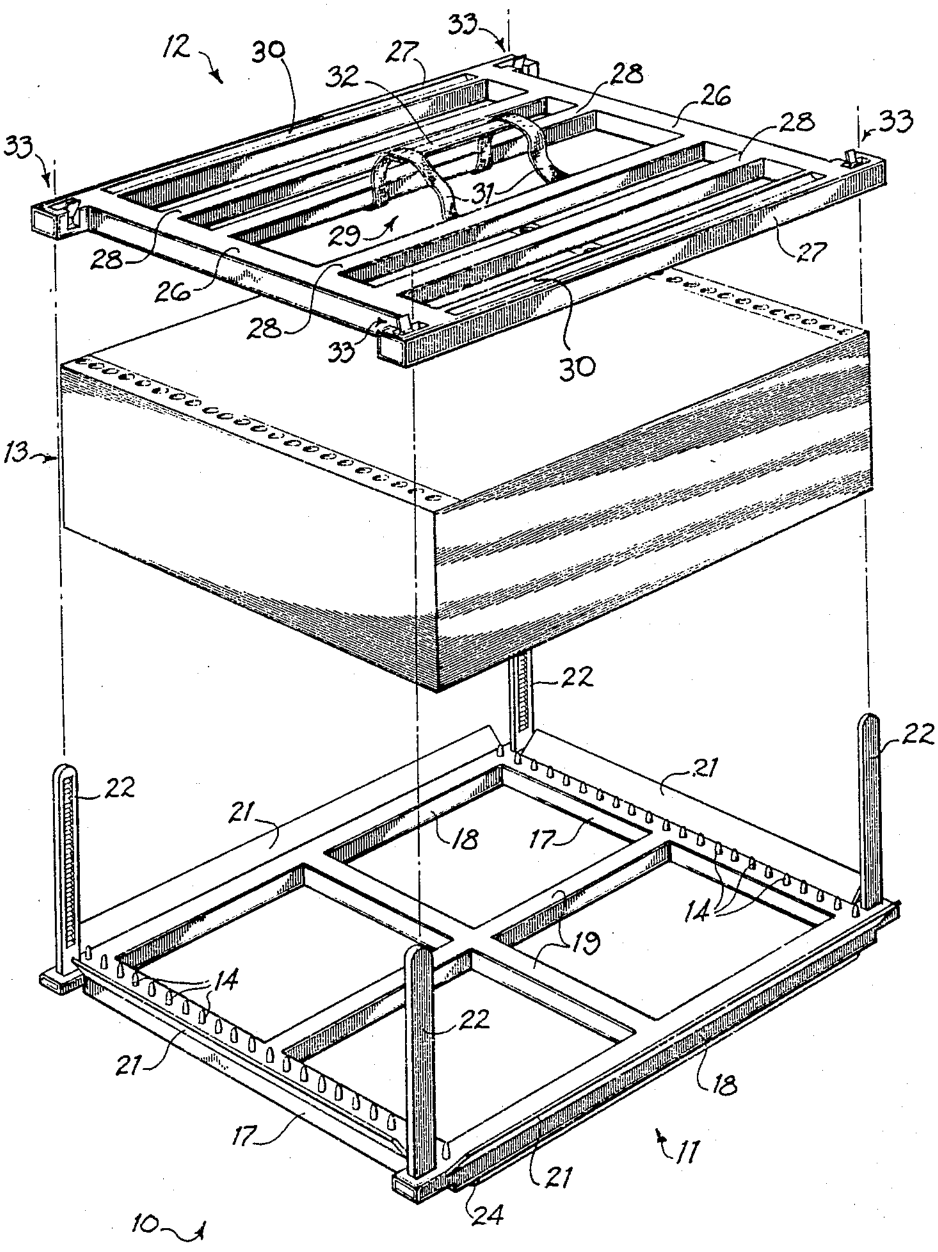
FIG. 1 is an exploded perspective view of the sheet material carrier showing the base member, sheet material and the cover member.

Referring now to the drawings in which like numerals represent like parts throughout the several views, FIG. 1 shows a carrier 10 adapted to contain and facilitate hand carrying of a stack of computer-type paper 13. While the term paper is used with respect to the preferred embodiment to refer to fan-fold computer paper, it will be understood that in general, the term paper is intended to encompass any of the various types of sheet material that could be accomodated by the present invention. Further, while stack 13 in FIG. 1 is shown to be of intermediate height, it is intended that taller or shorter stacks than that shown be accommodated by the carrier.

Carrier 10 comprises a base 11 sized to support a stack of paper 13 and a cover 12 adapted to overlie paper supported on the base 11. The base 11 is seen to be substantially rectangular havinq opposed end legs 17 and opposed side legs 18 with the base having a size corresponding to the dimensions of the paper to be supported.

Figure 2:
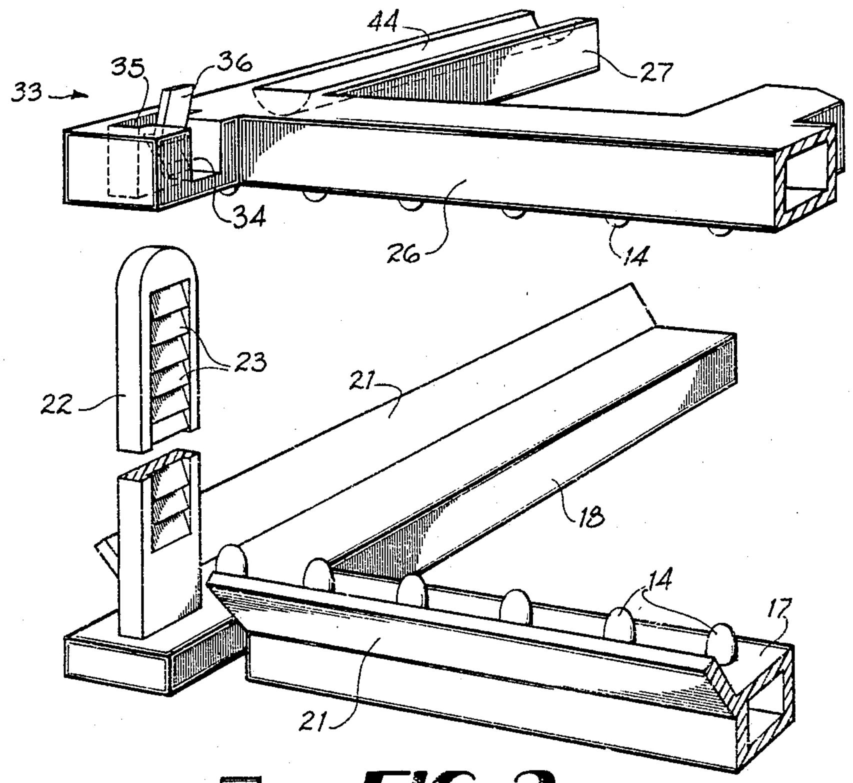
FIG. 2 is a detailed perspective of a corner of the sheet material carrier showing the ratcheted stanchions and latch means.
Figure 3:
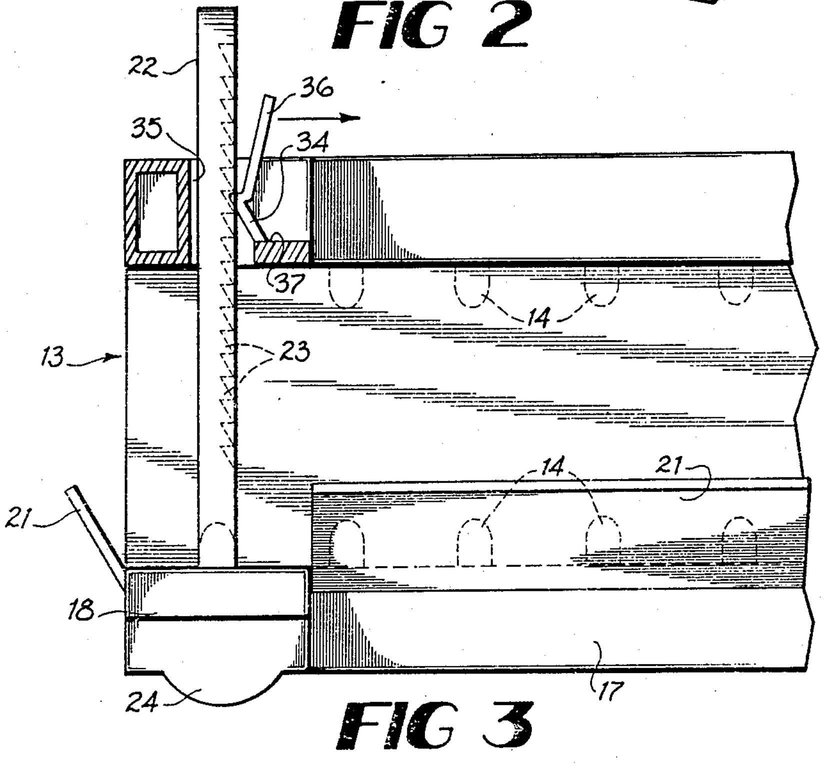
FIG. 3 is a partially sectional side elevation of a portion of the sheet material carrier showing the operation of the ratchet and pawl mechanism.

Arranged along opposed end legs 17 of the base 11 are upstanding pins 14. The pins 14 are sized and positioned to register with and extend into the marginal edge perforations formed in the paper 13. The cover 12 also bears pins 14 as best seen in FIGS. 2 and 3. In the preferred embodiment, the pins 14 are tapered to fit easily into the marginal edge perforations of the paper. It will be understood, however, that pins of various other configurations such as, for example, cylindrical with rounded end portions, could be used with equally acceptable results.

The end legs 17 and side legs 18 are interconnected by support members 19 with the support members 19 and the legs 17 and 18 together defining a plane upon which paper rests when supported upon the base. While support members 19 extend mutually perpendicularly between the end legs and side legs, it will be understood that various other configurations of the support members 19 such as, for example, support members extending between corners of the base, could perform equally well. The primarily function of the support members 19 is to support the central portion of sheet material resting upon the base so that it does not droop downwardly.

Mounted to each leg of the base is a guide flange 21 that extends upwardly and outwardly at an angle relative to the plane of the base. The guide flanges 21 are positioned to urge paper laterally into proper alignment with the pins 14 as the paper moves downwardly onto the base 11. The guide flanges 21 are particularly useful, for example, when the base is positioned to receive paper issuing from a computer printer. In this case, each successive sheet of the first several sheets to issue from the printer are guided by the flanges 21 into proper position upon the base 11 with the pins 14 registered with the paper's marginal edge perforations.

Figure 4:
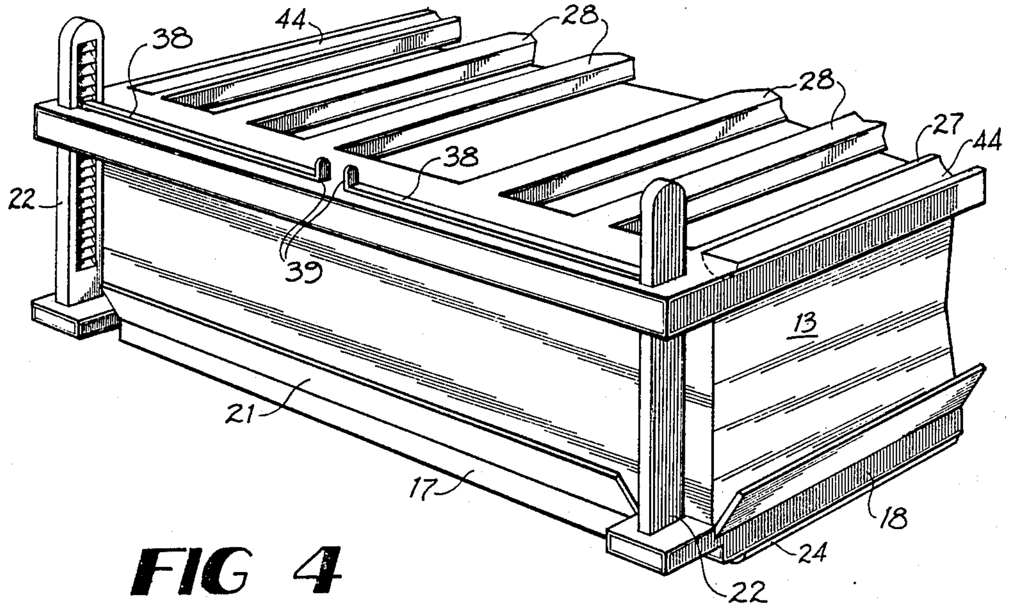
FIG. 4 is a partial perspective view of an alternate embodiment of the sheet material carrier showing one means for releasing the pawls from engagement with the ratchet teeth.

The end portions of the side legs 18 in FIG. 1 extend slightly beyond the end legs 17 and an upstanding elongated stanchion 22 is mounted to each of the end portions of the side legs. As best seen in FIG. 4, the stanchions are spaced to permit a stack of paper to rest upon the base without interference from the stanchions. As seen in FIGS. 2 and 3, each stanchion has a plurality of downwardly pitched ratchet teeth 23, 23 formed along the length of the stanchion on inwardly facing sides thereof. As more fully described hereinbelow, the stanchions are adapted to cooperatively couple with the cover 12 to releasibly couple the cover 12 and the base 11 together for carrying.

Formed along the underside of each side leg 18 of the base 11 is a depending rib 24. The ribs 24 function to support the base 11 in spaced relationship relative to a support surface so that the base and paper supported thereon can be easily lifted if desired by placing one's fingers under the end or side legs of the base 11 and lifting upwardly. Further, the ribs are sized to mesh with corresponding slots in the cover for stacking as more fully described below.

The cover 12 is substantially rectagular with a size corresponding to that of the base 11. Cover 12 has opposed end legs 26 and opposed side legs 27 with the end legs 26 having support ribs 28 extending therebetween. Mounted to the two inner support ribs 28 is a handle 29 that includes flexible straps 31 fastened to and extending between the inner ribs 28 and a rigid handle element 32 mounted at its ends to the flexible straps 31 intermediate their ends. With this arrangement, the handle element 32 and flexible straps 31 normally lie out of the way between inner support ribs 28 atop paper supported on the base but can be moved upwardly to a convenient position for hand carrying when desired. As with the base 11, the end portions of the cover side legs 27 extend slightly beyond the cover end legs 26.

The end portions of each side leg 27 bear latch means 33 positioned to register with the stanchions 22 upon movement of the cover 12 downwardly toward the base 11. As best seen in FIGS. 2 and 3, each latch means 33 comprises a rectangular opening 35 formed in the end portion of the side leg with the opening sized to receive a corresponding stanchion 22. A pawl 34 is hingedly attached at 37 to the side leg and extends upwardly into the opening 35. The pawl 34 is spring biased toward the opening 35 such that as the cover 12 moves downwardly toward the base with the stanchions 22 moving through the openings 35, each pawl engages and rides across the ratchet teeth of its corresponding stanchion. Upon downward movement of the cover to a position atop a stack of paper supported on the base, the handle portion of the cover is lifted upwardly causing each pawl to lockingly engage a ratchet tooth to couple the base and cover together. The cover, base and paper can then be lifted and carried to a desired location.

A lever 36 is attached to each pawl 34 and extends upwardly beyond the top surface of the cover. Movement of the lever in the direction of the arrow in FIG. 3 disengages the pawl from the ratchet teeth allowing the cover to be removed from atop the paper so that paper can be drawn from the stack for use.

FIG. 4 shows an alternate embodiment of the paper carrier in which elongated extensions 38 are attached to the levers of opposing latch means with the extensions extending inwardly toward each other. Wings 39 are formed on the end portions of the extensions 38 so that the pawls can be released from engagement with their ratchet teeth by squeezing the wings 39 toward engagement with each other. In this way, the cover can easily be decoupled from the base by squeezing the wings 39 on either side of the base and lifting the cover away from the base.

Elongated troughs 30 are formed in the tops of opposed side legs 27 and positioned to receive the ribs 24 of a base positioned atop the cover. In this way, carriers containing paper can be securely stacked for storage. The end portions of the base legs 18 are notched as shown in FIG. 2 to accommodate the levers of the latches of the next lowest carrier when carriers are stacked. To further accommodate stacking, stantions 22 can be scored for breaking so that they can be broken off at a score line so as not to interfere with the next highest stacked container. Alternately, the stantions could be flexible so as to be bendable out of the way when stacking carriers.

Figure 5:
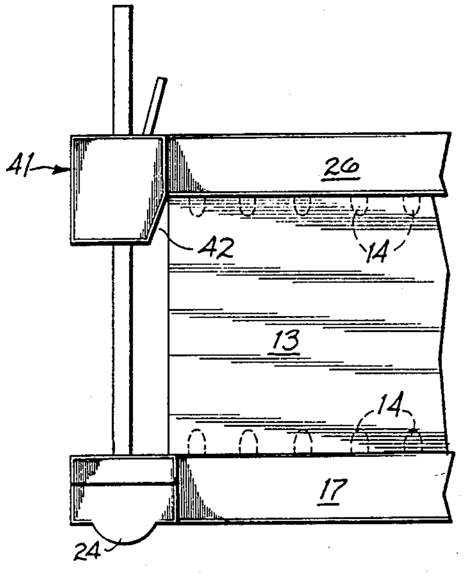
FIG. 5 is a side elevation of an alternate embodiment of the cover.

FIG. 5 shows an alternate embodiment in which the side legs 41 of the cover extend below the lower surface of the end legs 26 and are formed with an angled flange 42. With this embodiment, the flange 42 tends to guide the cover into proper position atop the paper so that the pins 14 of the cover also align with the perforated marginal edge portions of the paper upon movement of the cover onto a stack of paper supported on the base.

Figure 6:
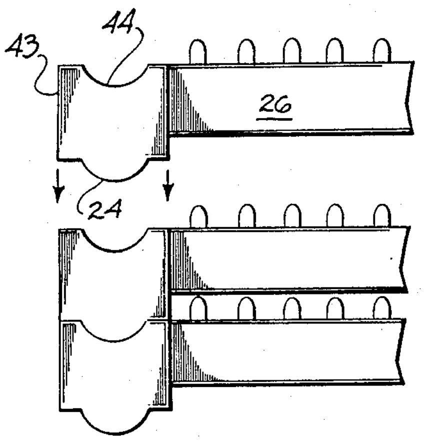
FIG. 6 is a side elevation of a stackable embodiment of the base member.

FIG. 6 shows another embodiment of the invention for use without an accompanying cover as, for example, when the base is used alone to receive and support paper issuing from a computer printer. In this embodiment, an elongated concave trough 44 is formed in the upper surface of each side leg 43 and the side leg extends below the lower surface of the end leg 26 with the lower surface of each side leg 43 bearing a convex rib 24. With this embodiment, a plurality of bases can be stacked for storage or shipment with the ribs 24 cooperatively engaging the trough 44 of the next lowest base as illustrated.

OPERATION

In use, sheet material such as fanfold computer paper is positioned atop the base 11. As the paper moves downwardly onto the base, the guide flanges 21 guide the paper into position upon the base with the pins 14 extending into the perforated marginal edge portions of the paper. Once the paper is in position on the base, the cover is moved downwardly atop the paper with each latch means receiving a corresponding stanchion. The base, cover and paper can then be carried to a desired location where the cover can be removed and the paper drawn from the stack and used in the conventional way.

Should one wish to store stacks of paper after it is collected, one need only apply the covers and stack with the base ribs meshed with adjacent top troughs.

If desired, stacks of paper can be packaged for shipment to users in boxes with the paper resting on a base within the box. Upon receipt, the user simply removes the box top and moves a cover into position atop the paper whereupon the cover, base and paper can be lifted from the box and carried to a desired location. For use in this way, bases would have no flanges or alternately, hinged flanges so that the paper would fit tightly into the shipping box to prevent shifting.

An empty base can be located to receive paper issuing from a printer if desired. The guide flanges tend to guide the paper into position on the base as the paper is received and, when the base has been filled, a cover can be attached and the paper easily removed.

The invention has been described in terms of preferred embodiments. It will be obvious to those of skill in the art that various changes, additions and modifications can be made to the preferred embodiments without departing from the spirit and scope of the invention as set forth in the claims.

What is claimed is:

1. An apparatus for supporting and transporting sheet material of the type having perforated marginal edge portions, said apparatus comprising:

a base member to support the sheet material with said base member defining a plane upon which the sheet material rests;

a plurality of pins mounted to said base member and extending upwardly therefrom with said pins being adapted to register with and extend through the perforated marginal edge portions of sheet material supported upon said base member; and means for guiding sheet material into position upon said base member with said pins extending through the perforated marginal edge portions of the sheet material, said means comprising at least one guide element mounted to a peripheral portion of said base member and extending upwardly and outwardly therefrom at an angle relative to the plane of said base.

2. The apparatus as claimed in claim 1 wherein said base member is substantially rectangular having spaced side legs connected by spaced end legs and wherein each of said end and side legs includes a guide element extending upwardly and outwardly therefrom at an angle relative to the plane of said base.

3. The apparatus as claimed in claim 2 wherein said base member includes a plurality of stantions extending upwardly therefrom and wherein said apparatus further comprises cover means that includes latch means with said latch means to receive and releasably couple with said stantions upon movement of said oover means into a position atop sheet material supported upon said base member.

4. The apparatus as claimed in claim 3 wherein said cover means further includes a handle portion mounted thereto and positioned to facilitate hand carrying of said apparatus and sheet material contained therein.

5. The apparatus of claim 1 wherein each of said side legs includes a rib depending therefrom and adapted to support said base member in an elevated position above a surface.

6. An apparatus for receiving and supporting a stack of fan fold paper of the type having perforations formed along opposed edge portions, said apparatus comprising a substantially rectangular base member having opposed end portions positioned to underlie the opposed edge portions of paper resting on said base member with said end portions including a plurality of upstanding pins adapted to register with and extend at least partially through the perforations, and guide means for guiding paper into position on said base member with said pins extending into the perforations.

7. The apparatus of claim 6 wherein said guide means comprises at least one flange mounted to said base member and extending upwardly and outwardly from a peripheral portion thereof.

8. The apparatus of claim 6 further comprising means adapted to facilitate carrying of said apparatus and paper contained therein, said means comprising a plurality of stantions extending upwardly from said base member about the periphery thereof and a cover member bearing handle means with said cover member including latch means adapted to receive and releasably couple with said stantions upon movement of said cover member into position atop paper supported on said base member.

9. The apparatus of claim 8 wherein each of said stantions includes a plurality of ratchet teeth disposed therealong and wherein said latch means comprises a plurality of latch members adapted to receive said stantions, each of said latch members including a pawl adapted to engage said ratchet teeth upon movement of said cover member into position atop paper supported on said base member, said pawl being selectively movable out of engagement with said ratchet teeth to allow said cover member to be removed from atop the paper.

10. The apparatus of claim 9 wherein each of said pawls includes a lever positioned to facilitate movement of the pawl out of engagement with said ratchet teeth.

11. A method of supporting and transporting sheet material of the type having perforated marginal edge portions, said method comprising the steps of:

(a) providing a base to support the sheet material with the base having upstanding pins adapted to extend at least partially into the perforated marginal edge portions of sheet material supported on the base and stantions extending upwardly about the periphery of the base;

(b) guiding the sheet material into position on the base with the pins extending into the perforated marginal edge portions;

(c) providing a cover that includes a handle with the cover adapted to releasably couple with the stantions upon movement of the cover into position atop sheet material supported upon said base;

(d) moving the cover into position atop the sheet material; and (e) lifting the handle to transport the base, cover and sheet material.

12. The method of claim 11 further comprising the step of:

(f) decoupling the cover from the stantions; and (g) removing the cover from its position atop the sheet material.

* * * * *